Feb. 5, 1929.
L. O. GLATZNER
1,701,204
AIRCRAFT COMMUNICATION APPARATUS
Filed Jan. 13, 1926
2 Sheets-Sheet 2
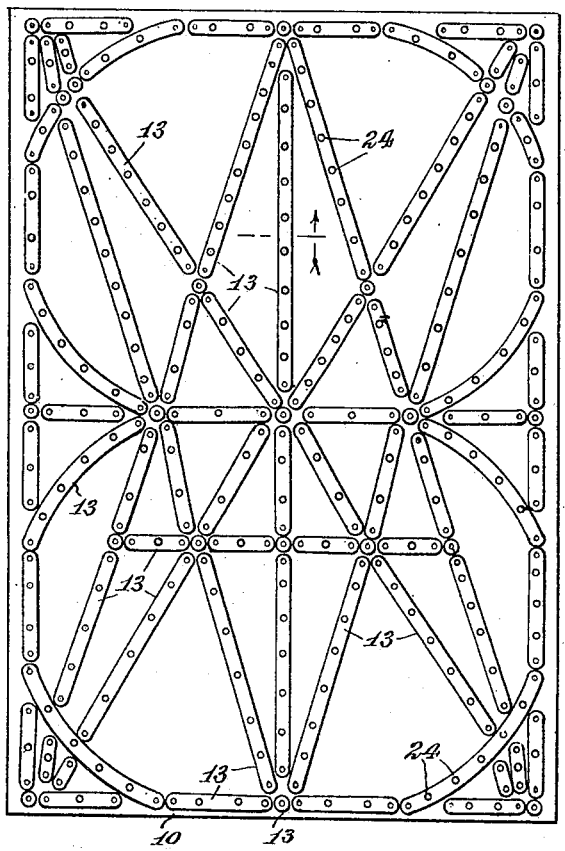
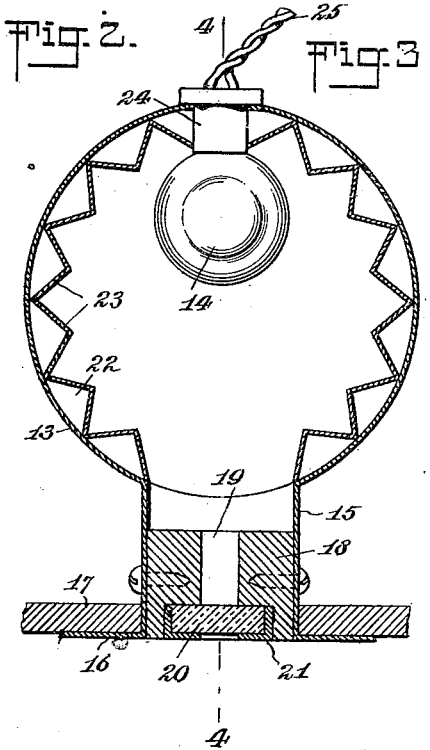
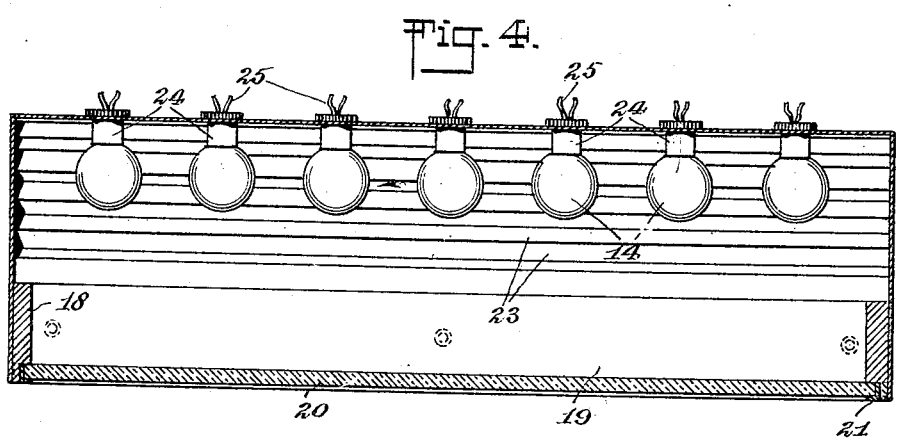
WITNESSES
INVENTOR
Louis O. Glatzner
BY
ATTORNEYS Patented Feb. 5, 1929.

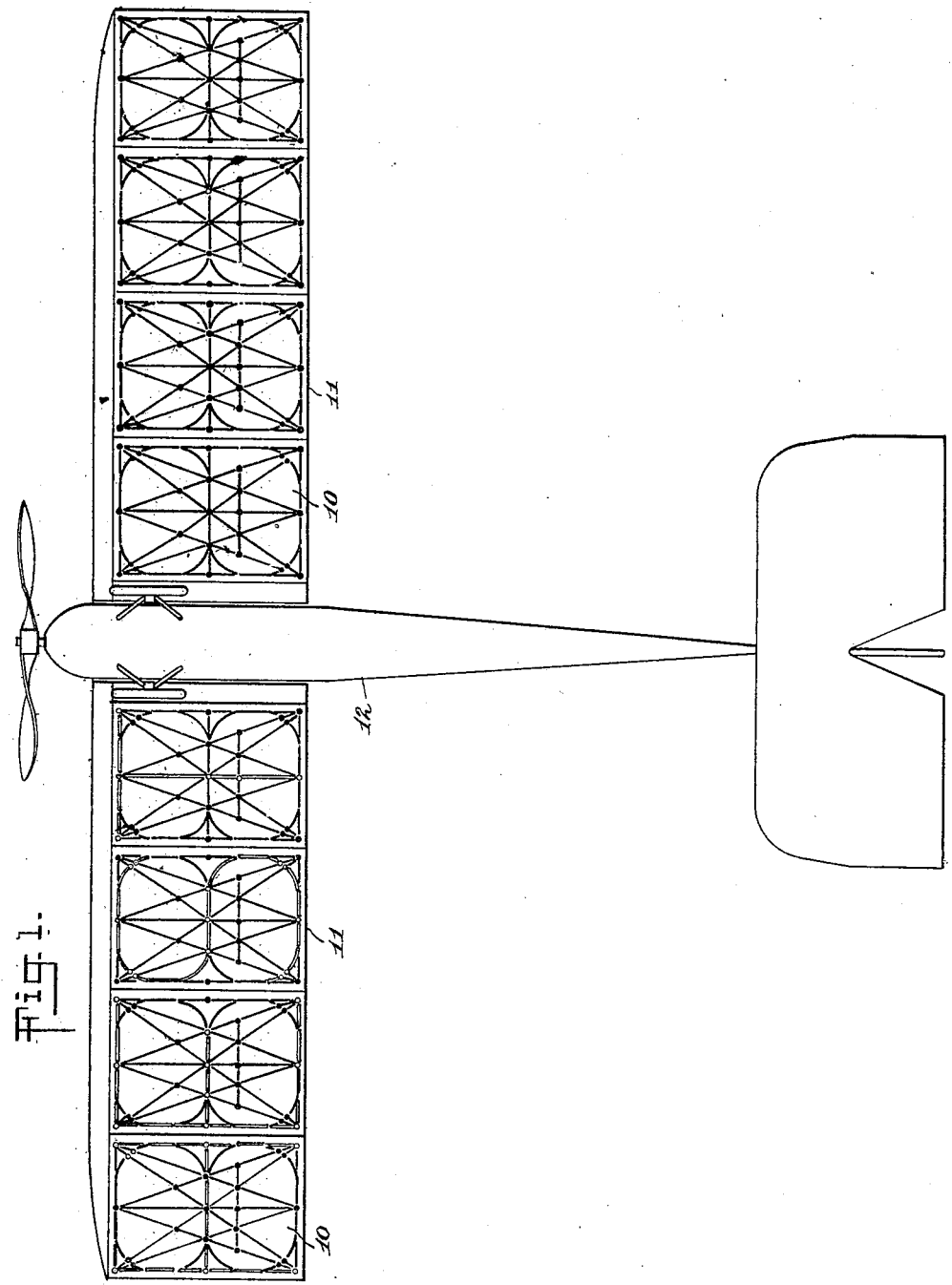

1,701,204

UNITED STATES PATENT OFFICE.

LOUIS O. GLATZNER, OF HASBROUCK HEIGHTS, NEW JERSEY.

AIRCRAFT COMMUNICATION APPARATUS.

Application filed January 13, 1926. Serial No. 81,059.

My invention is an illuminated apparatus useful in various arts and for various purposes, a special utility being the availability of the invention for signalling and communication purposes on and from an aircraft in flight, whereby signals from a swift moving aircraft may be sent to the ground or to a land station.

It is not desired to confine the invention to aircraft communication and signalling, for the reason that said invention possesses marked utility as an illuminated sign for general display purposes.

In the arts relating to signalling from moving craft, and for display purposes, it is essential that a character, letter or symbol shall be illuminated to render the same visible to the eye in darkness, and be readable with clearness and certainty, and this is particularly desirable when considerable distances intervene between the observer and the illuminated display, and, moreover, clear visibility is demanded when the apparatus is moving on an aircraft in rapid flight.

The principal object of my invention is distant visibility with certainty and precision.

A further object is to attain economy in the consumption of electric current utilized for energizing electric lamps which constitute components of the illuminated apparatus.

My invention is embodied in one practical type of apparatus constructed in the form of a letter, character or symbol, hereinafter referred to as a character, with means for illuminating such character, and embodying means whereby beams of light are projected on relatively thin lines. To attain distant visibility, the light rays are concentrated and projected, and to these ends provision is made for such concentration and projection by employing reflectors and lenses associated with incandescent lamps and by utilizing members which have restricted light outlets, and which members constitute the outlines for the character, and the component parts thereof, whereby light rays emanating from the lamps are concentrated and projected on thin lines in a manner to attain the required distant visibility.

In my apparatus, the components of the characters are of apertured formation with restricted light openings, and with each apertured member is associated a plurality of lamps, said lamps being associated with a reflector and a lens to the end that maximum visibility of the character is afforded at extreme distances. The beams of light from the components of the character are projected on relatively thin distinct lines, and such light beams are of relatively great intensity, to the end that there is a minimum dispersion of the light rays, whereby to eliminate the merging of the beams from the apertured components of the character, thus effectively adding to the efficiency of the apparatus by avoiding the merging of the beams from one apertured component with the beams from other apertured components of the same character or of a different character, with the ultimate effect of attaining clear and distinct visibility over relatively great distances.

My apparatus when used on an aircraft is designed to be embedded, countersunk or otherwise associated with the wings or flying surfaces in a manner to avoid obstruction with the functions of such craft. Again, the illuminated apparatus when used on an aircraft is in the form of a changeable visual sign, whereby communication may be established between such aircraft and the ground or with a land station.

According to my invention, the light rays are concentrated and projected in a way to utilize the full illumination afforded by the lamps, and such utilization of the light rays not only renders possible the desired distant visibility, but enables me to attain a desirable economy in the consumption of electric current. This factor of economy in the current required for the energization of the lamps is desirable in aircraft, reducing the weight and space necessary for the equipment, and it is desirable, also, when the apparatus is used for general display purposes, such as a sign on high buildings in a city or town.

Other functions and advantages of the invention will appear from the following description taken in connection with the drawings, wherein—

Figure 1 is a bottom plan view of an airplane equipped with an illuminated sign or signalling apparatus constructed in accordance with the invention;

Fig. 2 is an enlarged detail rear view of one of the composite letters constituting the communication apparatus;

Fig. 3 is an enlarged detail transverse sectional view taken approximately on the line 3—3 of Fig. 2;

Fig. 4 is a longitudinal sectional view taken approximately on the line 4—4 of Fig. 3.

Referring to the drawings by characters of reference, the sign or signaling apparatus is composed of one or more composite letters designated generally by the reference character 10, the said letters being illustrated as embedded, countersunk, or otherwise associated with the lower surface of the wing 11 of an airplane 12 for which use the apparatus is particularly, although not necessarily, designed.

In order to obtain the maximum visibility of the letters, numerals, or other characters to be displayed by the composite letters 10, at extreme distances, each composite character is made up of a plurality of members 18 with each of which is associated a lamp housing 13, a reflector 22 within said housing, a lens 20 at a light outlet of the member 18 and from the housing 13, and a plurality of lamps 14 within said housing 13. The members 18 and the associated parts are positioned or arranged to constitute the lines of the character, or of the composite character illustrated in Figures 1 and 2.

The members 18 composing the character are each provided with a light outlet 19 of relatively narrow cross section, said light outlet being continuous or substantially continuous, as shown. The lamp housing may be of various cross sectional forms, the same in some instances being of cylindrical cross section, see Figure 3, and in other instances the housing may be spherical in cross section, the cross section depending upon the number of lamps 14 to be housed therein or upon the nature of the components or elements which go to make up the character to be illuminated.

Each lamp housing is shown as being provided with a neck 15, the latter being reduced in width relatively to the diameter of the housing, said neck 15 being provided with a flange 16 at the free end, and said flange affording appropriate means for the attachment of the lamp housing fixedly to the surface 17 of the supporting wing or other support.

The apertured member 18 is positioned within the reduced neck portion 15 of the lamp housing, suitable means being shown in Figures 3 and 4 for the fixed attachment of said member 18 and the neck portion of said lamp housing.

A lens 20 is desirably attached to the apertured member 18 as by a retaining sleeve 21, and said lens 20 is across the restricted light outlet 19, thus positioning the lens to intercept the rays of light. The lens functions as a means for projecting said concentrated light beams for a relatively great distance.

In order to obtain a reflection of maximum power from the lamps 14, the interior of the housing is provided with a highly polished sinuous lining 22 presenting a plurality of angularly disposed reflecting surfaces 23 for greatly increasing the power of the lamps 14. The lamps are mounted in sockets 24 diametrically opposite the slits or openings 19, and the sockets are connected by electrical conductors 25 with a suitable controlling device, not shown, for selectively lighting the housings 13 to produce the desired letter, figure, or other character, on each composite letter 10.

It is obvious from the foregoing construction that the letters, figures, or other characters, produced on each composite letter will be defined or delineated by a narrow strip of illumination so that the merging of the lines into each other when viewed from extreme distances, will be reduced to a minimum. This is especially essential in aircraft advertising or signaling where it is necessary for the aircraft to maintain a safe flying altitude.

The apertured members 18 are within the necks 15 of the lamp housings and constitute closures therefor, said members 18 being removable or demountable from said lamp housings, thus permitting access to the lamp housings for replacement of defective or burned out lamps.

In the service of the apparatus, the rays of light from the lamps within the housings are collected by the multi-faced mirrors, the latter functioning as means for concentrating the light rays and reflecting said rays in the form of light beams emanating through the restricted openings 19, whereas the lenses 20 project the light beams on definite lines which precludes dispersion of the illumination and in effect overcomes a tendency to commingle the beams emanating from the components of the character. The concentration of the light by the reflectors, and the projection of the resulting beams by the lenses, utilizes the maximum illumination afforded by the lamps and provides for the projection of the beams of light on definite lines, and within narrow limits, and without dispersion of the beams, thus attaining distinct illumination of the components of each character, and affording the desired distant visibility.

What is claimed is:

1. In a composite letter for distant communication, lamp housing sections of circular configuration in cross section, a reduced neck for each housing, a closure member in said neck having a constricted light outlet opening and a lens, a lamp constituting a source of light in each lamp housing disposed diametrically opposite to the constricted outlet, and a substantially circular multi-faced reflector for greatly increasing the power of the source of light.

2. In a composite letter for distant communication, elongated lamp housing sections of circular configuration in cross section, a reduced neck for each housing, a closure member in said neck having a constricted light outlet opening and a lens, a lamp constituting a source of light in each lamp housing disposed diametrically opposite to the constricted outlet, and a substantially circular multi-faced reflector for greatly increasing the power of the source of light, the said sources of light in the various lamp housings adapted to be selectively controlled and when illuminated, adapted to delineate the characters in fine lines to obtain high visibility.

3. In an illuminated apparatus, a casing of channel form in cross section, a series of illuminating units encased therein, and means for reflecting and concentrating the light rays emanating from illuminating units each casing having a passage elongated and restricted both longitudinally and transversely of the length of the casing for projecting said light rays as beams of high intensity and relatively narrow limits, whereby distant visibility is attained.

4. In an illuminated apparatus, a member provided with a light opening of restricted area, a series of illuminating units therein, means for collecting and reflecting the rays emanating from said illuminating units, each casing having a passage elongated and restricted both longitudinally and transversely of the length of the casing, means for projecting the collected light rays in the form of concentrated light beams issuing on definite lines through said restricted light openings, whereby distant visibility is attained.

5. In an illuminated apparatus, a plurality of channeled members assembled to simulate a desired character, said members being provided with restricted light openings, a series of illuminating units associated with said members, each casing having a passage elongated and restricted both longitudinally and transversely of the length of the casing for collecting and reflecting the light rays emanating from said illuminating means, and lenses for projecting the collected and reflected rays as light beams on definite lines, whereby distant visibility is attained.

6. In an illuminated apparatus, a plurality of members assembled to simulate a desired character, said members having light openings of restricted area, a series of housings associated with said members, illuminating units within said housings, each casing having a passage elongated and restricted both longitudinally and transversely of the length of the casing for collecting the light rays and reflecting the same through said restricted openings, and lenses for projecting the reflected rays in the form of light beams possessing the intensity requisite for distant visibility.

7. In an illuminated apparatus, a plurality of apertured members assembled to simulate a desired character, a series of housings associated with said members, illuminating units within said housings, reflectors whereby the light rays are collected and reflected through the apertures of said members, each casing having a passage elongated and restricted both longitudinally and transversely of the length of the casing, and lenses operable for projecting the light on definite lines as light beams possessing the intensity requisite for distant visibility.

8. In an illuminated apparatus, a plurality of apertured members assembled to simulate a desired character, housings associated with said members, said housings provided with neck members of channeled formation and having light outlets elongated and restricted both longitudinally and transversely of the length of the character, multi-faced reflectors within said housings, lamps encased within said housings, and lenses positioned for projecting the reflected light rays on definite lines in the form of beams possessing the intensity requisite for distant visibility.

9. In an apparatus for signal and display, a character of channeled cross section, illuminating units positioned therein, each character having a light outlet elongated and restricted both longitudinally and transversely of the length of the character, and means cooperable with said units and unitary with the character for concentrating light rays and for projecting such rays in the form of light beams possessing the intensity requisite for distant visibility.

10. In an apparatus for signal and display, a channeled character the components of which are provided with a series of illuminating units, each character having a passage restricted and elongated both longitudinally and transversely of the length of the character, means for concentrating the light rays emanating from said units, and means for projecting such concentrated rays as intensified light beams of narrow or restricted cross section, whereby distant visibility is attained.

11. In an illuminated apparatus, a character comprising a plurality of members having restricted light openings, a lamp housing of channeled form within said members, each housing having a passage elongated and restricted both longitudinally and transversely of the length of the casing, lamps within the housings, reflectors within said housing for collecting and reflecting the light rays, and lenses at the outer ends of said outlets cooperable with said apertured members for projecting the concentrated light rays on definite lines in the form of beams possessing the intensity requisite for distant visibility.

LOUIS O. GLATZNER.